June 20, 1967 C. L. HURST 3,325,905
METHOD OF AND APPARATUS FOR AXLE ALIGNING
Filed Jan. 11, 1965 3 Sheets-Sheet 1
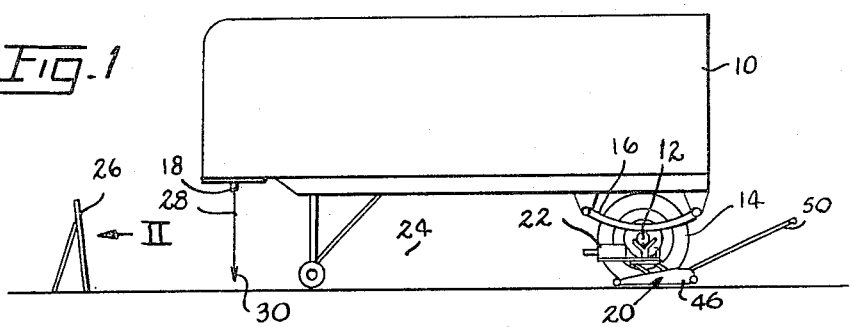
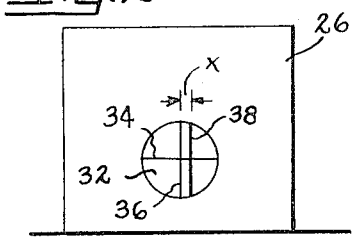
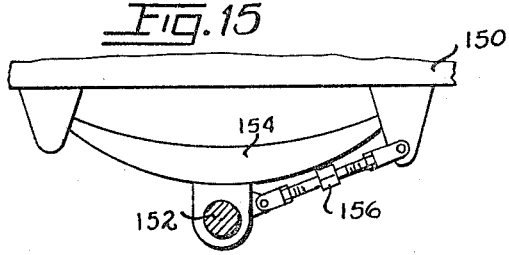
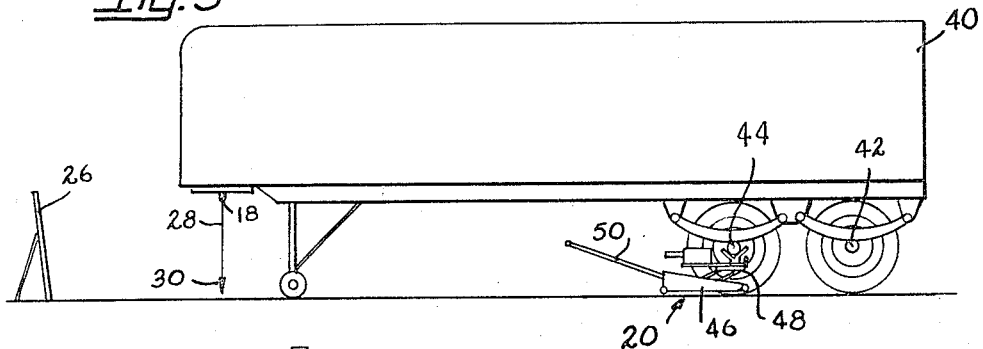
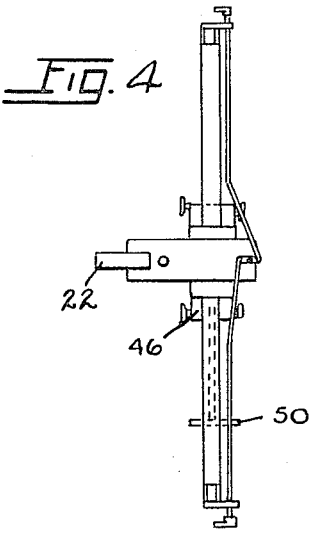
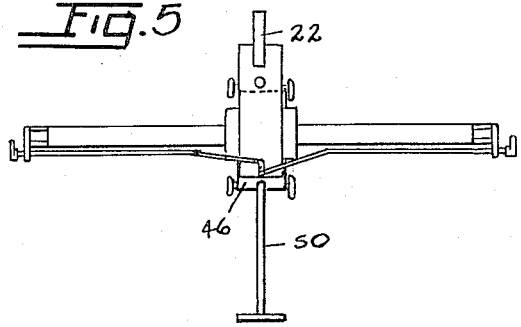
INVENTOR
CHARLES L. HURST
BY

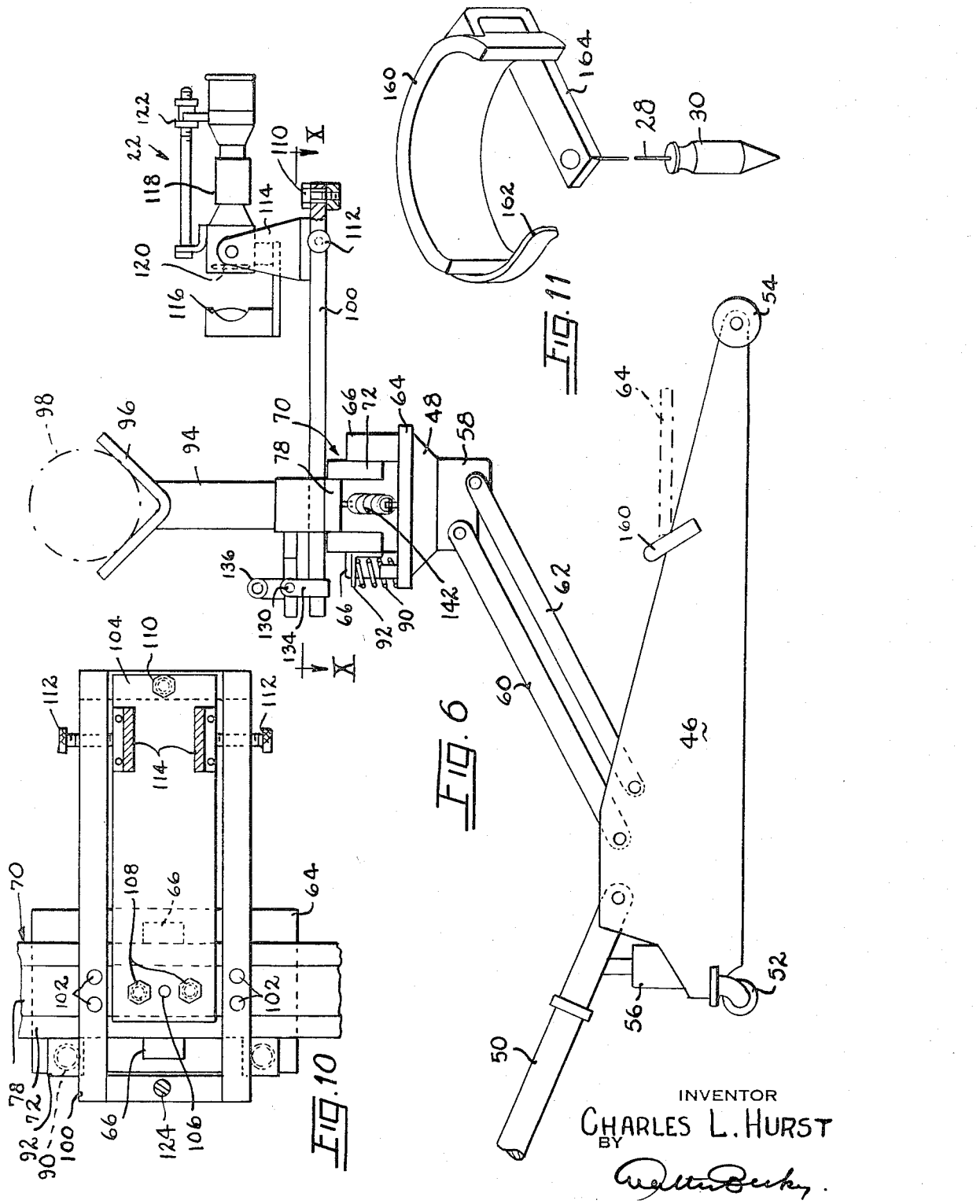

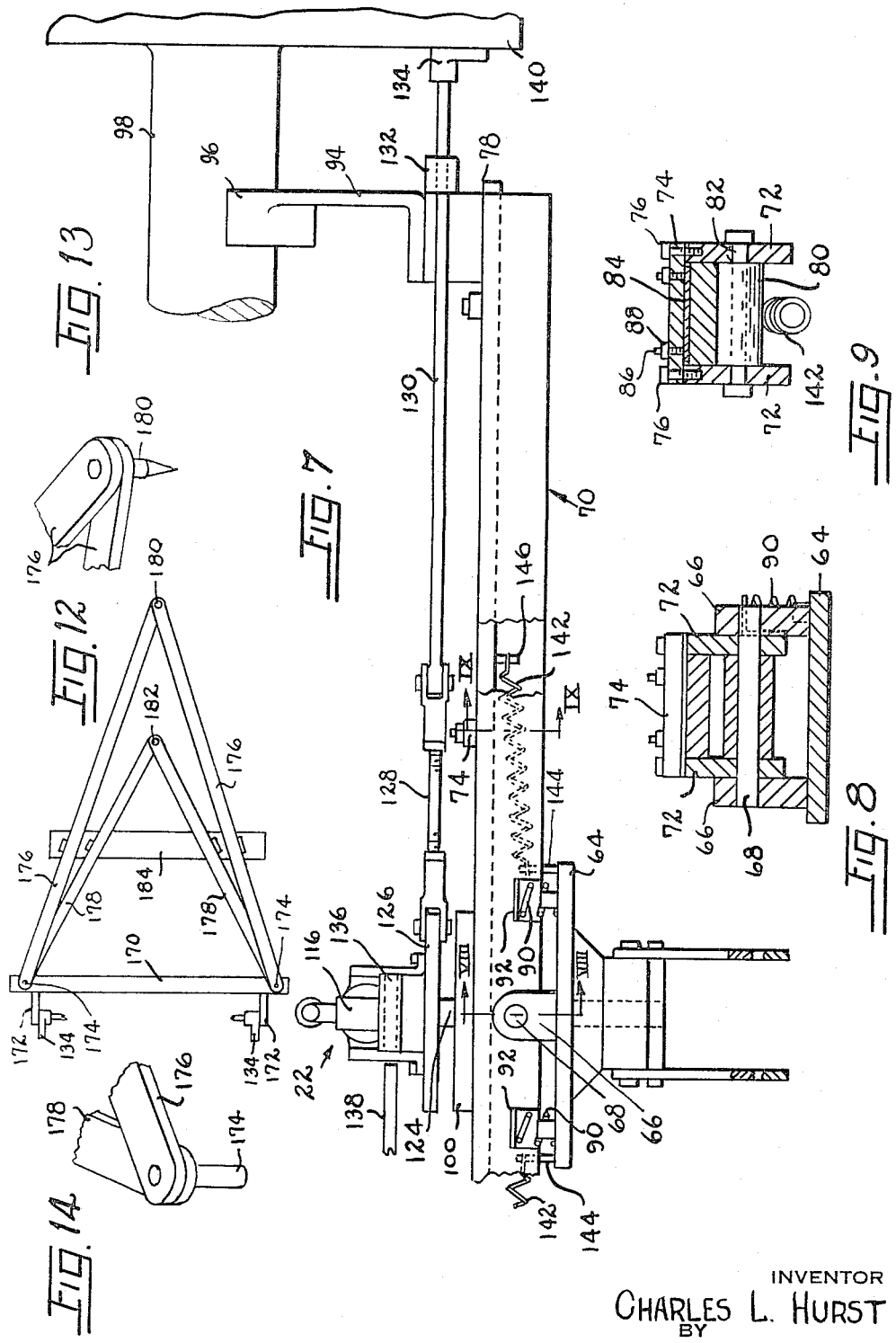

United States Patent Office
3,325,905
Patented June 20, 1967

3,325,905
METHOD OF AND APPARATUS FOR
AXLE ALIGNING
Charles L. Hurst, Dayton, Ohio, assignor to Manufacturers Machine Co., Dayton, Ohio
Filed Jan. 11, 1965, Ser. No. 424,532
17 Claims. (Cl. 33—193)

This invention relates to an axle aligning device and to a method of aligning axles, and is particularly concerned with such a device and method for use in alignment of the axles of trailers of the type that are coupled to tractors by fifth wheel structures. More particularly still, the present invention is concerned with an extremely compact unit of the nature referred to, which is readily portable and inexpensive to manufacture and simple to use.

The problem of aligning trailer axles has always presented certain difficulties, but it is important because trailers having misaligned rear axles not only cause extremely rapid tire wear but some instability is imparted to the trailer that could cause it to jacknife when suddenly braked.

The present invention is particularly concerned with an arrangement whereby the alignment of trailer axles can quickly be checked and alignment thereof effected while the aligning device remains in position. Furthermore, the device of the present invention is readily portable and can be employed substantially anywhere that the trailers are located, whereby it is not necessary to bring the trailers to the aligning device. Still further, no special installation of the device is required, thus making it simpler to put the device into use.

With the foregoing in mind, a primary object of the present invention is the provision of a novel axle alignment checking device and to a method of operation thereof, especially adapted for use with the trailer portion of tractor-trailers.

Another object of the present invention is the provision of an axle alignment checking device which is inexpensive and compact and simple to use, and which produces superior results.

A still further object of the present invention is the provision of an axle alignment checking device which requires no special installation and which is readily portable so that it can quickly be brought to a trailer to be checked or moved from one trailer to another.

Still another object of this invention is the provision of a portable axle alignment checking device especially useful for checking the alignment of tractor axles, which can easily be shifted from one to another of a tandem axle trailer so that both axles of the trailer can quickly be checked.

A still further object is the provision of a novel method of checking the alignment of trailer axles which is at one time rapid and also highly accurate.

These and other objects and advantages of the present invention become more apparent on reference to the following specification, taken in connection with the accompanying drawings, in which:

FIGURE 1 is a schematic view of a single axle trailer having the alignment of the rear axle thereof checked;

FIGURE 2 is a view looking in the direction of FIGURE 1 showing a screen forming a part of the checking installation;

FIGURE 3 is a view like FIGURE 1 but showing a tandem axle trailer with the checking unit, according to the present invention, inserted under the front axle of the trailer;

FIGURE 4 is a schematic plan view showing the portable alignment checking unit, according to the present invention, in one position on its supporting frame;

FIGURE 5 is a view like FIGURE 4 but shows the alignment unit rotated 90° on its supporting frame from the position which it occupies in FIGURE 4;

FIGURE 6 is a side view of the alignment unit and the supporting base therefor in about the position which the unit occupies when engaged with a trailer axle;

FIGURE 7 is a partial rear view of the device in the position which it occupies in FIGURE 6 with the supporting base for the device removed;

FIGURE 8 is a sectional view indicated by line VIII—VIII on FIGURE 7 showing the pivotal connection between the base plate of the aligning device and the main part for the device;

FIGURE 9 is a sectional view indicated by line IX—IX on FIGURE 7 showing a detail of construction of the aligning device;

FIGURE 10 is a plan sectional view indicated by line X—X on FIGURE 6 showing, in more detail, the adjustable support for the projector forming a part of the invention;

FIGURE 11 is a perspective view showing a clip for supporting a line coaxially with the pin by means of which the trailer is pivotally connected to a tractor;

FIGURE 12 is a somewhat schematic plan view showing an arrangement of gauge bars for checking the alignment device;

FIGURE 13 is a perspective view showing the arrangement of a gauge pin at the point of intersection of the gauge bars;

FIGURE 14 is a fragmentary perspective view showing how the two gauge bars at each side of the unit of FIGURE 12 are doweled together at their rear ends; and FIGURE 15 is a schematic view showing one manner in which a trailer axle can be adjustably connected to the trailer.

Referring to the drawings somewhat more in detail, in FIGURE 1, tractor 10 is provided at the back with an axle 12 on the ends of which are wheels 14. Axle 12 engages spring 16 which is connected to the undercarriage of the tractor. The axle 12, as is well known, is adjustable fore and aft of the trailer at each end of the axle so that the axle can be adjusted into such a position that it extends exactly at right angles to the direction of movement of the trailer when it is drawn forwardly by a tractor.

The trailer includes at the front end a fifth wheel structure that comprises a pin 18 by means of which the tractor is connected to the trailer.

According to the present invention, a wheel alignment checking device generally indicated at 20 is inserted beneath axle 12 and aligned with the axle for effecting checking of the alignment. The checking device includes projector means 22 which casts a beam of light indicated by dot-dash line 24 forwardly beneath the trailer so that the beam of light falls on a screen 26 positioned in front of the trailer. The alignment device includes means for positioning the projector exactly midway between the wheels 14 and with beam 24 extending at right angles to axle 12.

Dependent from pin 18 is a drop cord 28 which is held taut as by plumb bob weight 30. The cord 28, due to the beam of light, will cast a shadow on screen 26.

As will be explained hereinafter, the beam of light is provided with cross lines which are employed for indicating the position of cord 28.

In FIGURE 2, the beam of light impinges on the screen and forms the spot of light 32 which has a horizontal cross line 34 and a vertical cross line 36. When the rear axle of the trailer is exactly aligned with the longitudinal axis of the trailer the shadow thrown by cord 28 will exactly align with vertical line 36. However, when the rear axle is not exactly aligned with the longitudinal axis of the trailer the cord will throw a shadow at 38 which is displaced laterally from line 36 as indicated by the dimension x in FIGURE 2.

When shadow 38 falls as indicated in FIGURE 2, one end or the other, or both ends, of axle 12 is adjusted in the proper direction to bring shadow 38 into coincidence with line 36, whereupon exactly proper positioning of the trailer axle will be had.

In FIGURE 3, trailer 40 has dual axles 42 and 44 at the back and in this view alignment device 20 is illustrated in engagement with the front axle 44. Axles 42 and 44 are independently adjustable in the fore and aft direction so that first one axle is checked in the manner above and, if necessary, adjusted into alignment and thereafter the other axle is checked and, if necessary, adjusted.

The alignment unit comprises basically a lift truck 46 of known type, which has a platform 48 thereon which can be raised and lowered in parallelism with itself by means of a hydraulic system integral with the lift truck and operated by the handle 50 of the truck. This platform is pivotal about a vertical axis so that the alignment unit can be placed in one position on the lift truck as it is disclosed in FIGURE 1, for checking rear axles but can readily be reversed on the lift truck, as shown in FIGURE 3, for checking front axles.

Furthermore, the equipment can be collapsed and can readily be moved about on the wheels of the lift truck in the manner that such lift trucks are ordinarily moved about.

As will be seen in FIGURE 4, the alignment unit can be turned so that the length thereof extends in the direction of the length of the lift truck, whereby the device is relatively compact, or the device can be turned so that the length thereof extends at right angles to the length of the lift truck which is the position occupied by the device when it is in use.

Turning now to FIGURES 6 through 10, FIGURE 6 will show that lift truck 46 includes the wheels 52 and 54 by means of which the truck is readily moveable by availing of handle 50 which, as mentioned, is also utilized for actuating the hydraulic system which is illustrated, but which is conventional and which includes pump means 56 operated by vertical movement of the handle.

The aforementioned platform 48 of the truck is pivotal on a vertical axis on a support block 58 which is moveable up and down in parallelism with itself relative to the base portion of the lift truck by the parallel arms 60 and 62 which are actuated in vertical swinging movements by the aforementioned hydraulic system.

The alignment device proper comprises a base member or base plate 64 which is fixedly secured to the aforementioned platform 48 by any suitable bolt means so as to be rigid therewith. Base member 64 carries bearing members 66, best seen in FIGURES 6, 7 and 8 between which extends a pivot shaft 68. Pivot shaft 68 pivotally supports a transversely extending structure generally designated 70 and which comprises spaced vertical side plates 72 which are interconnected at spaced points therealong by transversely extending bars 74 which are secured to plates 72 by cap screws 76. The assembly of the plates 72 and the bars 74 is a rigid unit tiltable in a vertical plane about the axis of pivot shaft 68.

Positioned between the upper ends of plate 70 is a horizontally extending slide bar 78 which is guided closely while being freely reciprocable in the direction of its length between side plates 72.

Slide bar 78 may be supported as by rollers 80 positioned therebeneath and rotatably supported on side plates 72 as by axles 82. The slide bar 78 is made free running in the direction of its length while eliminating lost motion thereof by providing plates 84 beneath at least some of the bars 74 which are adjustable into sliding confining arrangement with slide bar 78 by screws 86, which are locked in place by lock nuts 88.

The transversely extending structure 70 is yieldably maintained in a horizontal position by spring means 90 acting between spaced points of base plate 64 and angle clips 92 carried on one of the side plates 72.

Toward the outer ends of the structure 70, there are provided the upstanding members 94 having upwardly opening V members 96 at the upper ends. These V-shaped members are adapted for engaging the underside of a trailer axle 98.

The provision of the two V members 96, at opposite ends of the structure 70, insures that when the alignment device is elevated and the V members engage the axle the structure 70 will be held parallel to the axle and in the same vertical plane as the axle, thus providing for a first step in determining the position of the axle with respect to the longitudinal axis of the trailer.

Mounted on slide bar 78 in the center thereof and fixed to the slide bar so as to be moveable laterally therewith is a support frame 100. Support frame 100 is fixedly bolted to slide bar 78 as by bolts 102. Located within the confines of support frame 100 is projector support platform 104. This platform at its back end is connected to slide bar 78 by a dowel pin 106 extending in the vertical direction. Cap screws 108 bolt the rear end of the projector support platform to slide bar 78, but the bolts pass through clearance holes in the projector platform so that the projector platform is adjustable about the axis of dowel pin 106.

The opposite or forward end of the projector platform is similarly bolted by a bolt 110 to the front end of frame 100.

Adjustment screws 112 extending through opposite sides of frame 100 and into engagement with the sides of the projector support platform provide means for adjusting the projector platform about the axis of dowel pin 106 when bolts 108 and 110 are loosened. Tightening of the bolts will clamp the said platform in its adjusted position.

Near the forward end of platform 104 there are provided the spaced upstanding trunnions 114 which pivotally support the projector 22, previously referred to. The projector comprises a shielded light source 116 and an adjustable light system 118 which includes within the system the carrier 120 for throwing the cross lines 34 and 36 on the screen 26. Adjusting means 122 is provided for focusing the projector for different particular distances from screen 26.

Upstanding from the rear end of frame 100 is a pivot post 124 on which is pivotally mounted a bar 126. Bar 126 extends in both directions from pivot post 124 and each end of bar 126 has pivoted thereto an adjustable link 128. Link 128 is, in turn, pivoted to a rod 130 guided for lateral movement in a support member 132 at the adjacent extreme end of the structure 70. Each rod 130 at its extreme outer end carries an abutment member 134.

The aforementioned bar 126 is rotatable about pivot post 124 for moving the rods 130 simultaneously inwardly or outwardly. This is accomplished by the eye member 136 connected with bar 126 adapted for receiving an actuating handle 138.

Inasmuch as the rods 130 are moveable outwardly simultaneously, this arrangement can be utilized for quickly and accurately positioning the projector midway between the trailer wheels. This comes about by making both ends of bar 126 equal in length and adjusting the respective adjustable links 128 so that in an outwardly adjusted position of abutment 134 the projector will be exactly midway between the abutment members. The abutment members are adapted for engaging the brake plates 140 or some like portion of the pertaining wheels, which is the same on both sides of the trailer, so that a reliable centering of the projector will be had.

The slide bar 78 is advantageously biased toward a predetermined center position by spring means 142, which are connected between pins 144 on base plate 64 and pins 146 on slide bar 78. These springs, of course, permit lateral movement of slide bar 78 when rods 130 are actuated to move abutment members 134 outwardly.

In operation, it is merely necessary to move the lift truck beneath the axle to be checked in about the middle of the trailer with the projector pointing forwardly, and then to elevate the lift truck until the V members 96 loosely embrace the truck axle. Plate 126 is, then, rotated to position abutment members 134 outwardly, which will result in automatic centering of the projector platform between the vehicle wheels. The lift truck is, then, lifted upwardly until V members 96 tightly engage the truck axle. At this time, the slide bar 78 will be exactly parallel with the axis of the truck axle and the projector will be exactly centered between the truck wheels. If the projector has been previously adjusted so that the beam therefrom is exactly at right angles to the length of bar 78 and exactly midway between abutment members 134, then this beam will extend at right angles to the truck axle and in the vertical plane which is normal to the truck axle and which passes through the center thereof. This plane, if the vehicle axle is properly aligned will, of course, pass through the axis of pin 18 and if the axle is not properly aligned it will be displaced laterally of the axis of the pin 18.

While various arrangements are available for effecting adjustment of the trailer axles, there is schematically illustrated in FIGURE 15 one of the better known structures. In this figure, the trailer structure is indicated at 150 and the axle is indicated at 152. The axle is connected with the spring 154. A turnbuckle 156 is provided connected between the axle and the trailer structure so that adjustment of the turnbuckle will adjust the trailer axle in the fore and aft direction. There would, of course, be a turnbuckle of the nature illustrated at each end of the axle of the trailer.

A feature of the present invention is to be found in the provision on the truck 46 of stop elements or members 160 secured to the sides of the truck as by welding. These stop elements are so spaced relative to base plate 64 that when the base plate is turned so that its greatest dimension extends in the fore and aft direction of the truck, the base plate is received between the members 160 and is thereby held against rotation. This would correspond to the position occupied by the device in FIGURE 4.

On the other hand, stop members 160 are so positioned longitudinally that when plate 64 is turned with its greatest dimension transversely of the truck, the stop elements engage the back edge of the plate and hold it against rotation. In this manner, whenever the device is collapsed, it is held against rotation about the pivot connecting members 48 and 58.

With regard to the hanging of drop cord 28 from kingpin 18, this can be accomplished quite simply by the use of a clip 160 receivable on the kingpin and retained thereon by spring 162. Clip 160 carries an arm 164 extending inwardly beyond the center of the kingpin and supporting cord 28 on the axis of the kingpin.

For aligning the mechanism, which is necessary periodically to insure that the instrument is properly adjusted, an arrangement of the nature illustrated in FIGURES 12, 13 and 14 can be employed.

FIGURE 12 shows a stationary frame 170 having spaced abutments 172 adapted for engagement by abutment members 134 of the alignment instrument. Frame 170 has holes evenly spaced from the center thereof for receiving dowel pins 174 for interconnecting the ends of the longer gauge bars 176 and shorter gauge bars 178. The opposite ends of bars 176 are connected by a pointed pin 180 while the opposite ends of the shorter bars are similarly connected by pointed pin 182. The two longer bars are equal in length and the two shorter bars are equal in length and, thus, the two pins lie in the plane which should contain the vertical cross line 36 of the light beam from the projector.

By arranging the bars, as illustrated in FIGURE 12, supported at their rear ends by frame 170 and intermediate their ends by another frame 184, calibration of the alignment instrument can be effected by positioning the instrument behind frame 170 and moving the abutment members 134 into engagement with abutments 172.

Thereafter such adjustments of the instrument may be made as are necessary to bring the vertical cross line 36 of the light beam into the vertical plane containing pins 180 and 182. This adjustment may involve adjustment of the adjustable links 128 to get the projector exactly centered between abutments 172 and may also involve adjustment of the projector support platform about dowel pin 106 so that the beam is projected at the proper angularity. As soon as these adjustments have been effected, thereby calibrating the instrument, it is ready to be used by alignment operations.

It is to be noted that the alignment instrument, according to the present invention, is substantially universally adaptable without any modification whatsoever of the trailer structures or of the axles thereof. It can be used at the time of manufacturing trailers to insure proper alignment of the trailer axle or axles with the longitudinal axis of the trailer, and it can be used as service equipment in trailer depots where trailers are maintained.

In any case, the checking of the alignment and the effecting of alignment, if necessary, can be accomplished quite rapidly and with a high degree of accuracy with a relatively simple, compact, inexpensive, easily portable and easily manipulatable device of the present invention.

It will be understood that this invention is susceptible to modification in order to adapt it to different usages and conditions; and accordingly, it is desired to comprehend such modifications within this invention as may fall within the scope of the appended claims.

What is claimed is:

1. A device for checking the alignment of the wheel and axle assembly of the trailer portion of a tractor-trailer which comprises; a wheel supported truck structure adapted for being moved into position adjacent the axle to be checked and including elements vertically moveable thereon and engageable with laterally spaced points of the axle from beneath to effect angular positioning of said structure relative to the axle in the horizontal direction, means carried by said structure and moveable laterally outwardly thereon so as to be adapted for engagement with laterally spaced regions of said assembly from the inside to position said structure relative to the assembly in the lateral direction, and optical means carried by said structure and establishing reference line means extending forwardly of the trailer at right angles to the lateral line established by said elements and midway between said laterally spaced regions for registration with a predetermined point of the trailer in the region of the front end thereof.

2. A device for checking the alignment of the wheel and axle assembly of the trailer portion of a tractor-trailer which comprises; a portable wheeled support truck having a platform moveable in substantial parallelism with itself in the vertical direction, and alignment checking means carried by the platform comprising a base plate fixed to the platform, an elongated structure supported on the base plate for tilting movement about a fore and aft axis, elements upstanding from spaced points of the structure for engagement with laterally spaced points of the axle upon vertical movement of said platform to position the structure angularly relative to the axle in the horizontal direction, means carried by the structure and moveable laterally outwardly thereon for engagement with laterally spaced regions of said assembly from the inside for positioning the structure laterally of the assembly, and optical means carried by said structure for establishing optical reference line means extending in the fore and aft direction of the trailer at right angles to the lateral line established by said elements and midway between said spaced regions and adapted for registration with the vertical center line of the kingpin at the forward end of the trailer.

3. A device for checking the alignment of the wheel and axle assembly of the trailer portion of a tractor-trailer which comprises; a portable wheeled support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate for tilting movement thereon about a fore and aft axis, wheel and axle assembly engaging means carried by said structure adjustable into engagement with said assembly to fix said structure in a predetermined spatial position relative to said assembly and with said structure substantially parallel to said axle, and optical means carried by said structure in about the center thereof for establishing optical reference line means extending in the fore and aft direction of the trailer and adapted for registration with the vertical center line of the kingping at the forward end of the trailer, said wheel and axle assembly engaging means including upstanding upwardly opening V's spaced in the direction of the length of said structure and adapted for engagement with the axle from beneath by vertical movement of said platform to locate the structure angularly of said assembly, and also including means laterally moveable on said structure for engagement with spaced regions of said assembly from the inside, said optical reference line means extending at right angles to the lateral line established by said V's and midway between said spaced regions.

4. A device for checking the alignment of the wheel and axle assembly of the trailer portion of a tractor-trailer which comprises; a portable wheeled support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate for tilting movement thereon about a fore and aft axis, wheel and axle assembly engaging means carried by said structure adjustable into engagement with said assembly to fix said structure in a predetermined spatial position relative to said assembly and with said structure substantially parallel to said axle, and optical means carried by said structure in about the center thereof for establishing optical reference line means extending in the fore and aft direction of the trailer and adapted for registration with the vertical center line of the kingpin at the forward end of the trailer, said wheel and axle assembly engaging means including abutment members on said structure and means for moving said abutment members laterally outwardly on the structure equal amounts in respectively opposite directions to engage spaced regions of the assembly from the inside and locate said structure in the lateral direction of the assembly, and also including V members engageable with said axle from beneath upon vertical movement of said platform, said optical reference line means extending at right angles to the lateral line established by said V's and midway between said spaced regions.

5. A device for checking the alignment of the wheel and axle assembly of the trailer portion of a tractor-trailer which comprises; a portable wheeled support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate for tilting movement thereon about a fore and aft axis, wheel and axle assembly engaging means carried by said structure adjustable into engagement with said assembly to fix said structure in a predetermined spatial position relative to said assembly and with said structure substantially parallel to said axle, and optical means carried by said structure in about the center thereof for establishing optical reference line means extending in the fore and aft direction of the trailer and adapted for registration with the vertical center line of the kingpin at the forward end of the trailer, said wheel and axle assembly engaging means including upstanding upwardly opening V's spaced in the direction of the length of said structure and adapted for engagement with the axle from beneath by vertical movement of said platform to locate the structure anglarly of said assembly, said assembly engaging means also including abutment members on said structure and means for moving said abutment members laterally outwardly on the structure equal amounts in respectively opposite directions to engage spaced regions of the assembly from the inside and locate said structure in the lateral direction of the assembly, said optical reference line means extending at right angles to the lateral line established by said V's and midway between said spaced regions.

6. A device for checking the alignment of the wheel and axle assembly of the trailer portion of a tractor-trailer which comprises; a portable support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate, wheel and axle assembly engaging means carried by said structure adjustable into engagement with said assembly to fix said structure in a predetermined spatial position relative to said assembly and with said structure substantially parallel to said axle, and optical means carried by said structure in about the center thereof for establishing optical reference line means extending in the fore and aft direction of the trailer and adapted for registration with the vertical center line of the kingpin at the forward end of the trailer, said wheel and axle assembly engaging means including upstanding upwardly opening V's spaced in the direction of the length of said structure and adapted for engagement with the axle from beneath by vertical movement of said platform to locate the structure angularly of said assembly, said assembly engaging means also including abutment members on said structure and means for moving said abutment members on the structure equal amounts in respectively opposite direction to engage spaced regions of the assembly and locate said structure in the lateral direction of the assembly, said means connecting the structure to said base plate comprising pivot means for permitting said structure to tilt on the base plate about a horizontal axis extending at right angles to the length of said structures.

7. A device for checking the alignment of the wheel and axle assembly of the trailer portion of a tractor-trailer which comprises; a portable support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate, wheel and axle assembly engaging means carried by said structure adjustable into engagement with said assembly to fix said structure in predetermined spatial position relative to said assembly and with said structure substantially parallel to said axle, and optical means carried by said structure in about the center thereof for establishing optical reference line means extending in the fore and aft direction of the trailer and adapted for registration with the vertical center line of the kingpin at the forward end of the trailer, said wheel and axle assembly engaging means including upstanding upwardly opening V's spaced in the direction of the length of said structure and adapted for engagement with the axle from beneath by vertical movement of said platform to locate the structure angularly of said assembly, said assembly engaging means also including abutment members on said structure and means for moving said abutment members on the structure equal amounts in respectively opposite direction to engage spaced regions of the assembly and locate said structure in the lateral direction of the assembly, said means connecting the structure to said base plate comprising pivot means for permitting said structure to tilt on the base plate about a horizontal axis extending at right angles to the length of said structure, and resilient means acting between said base plate and structure urging said structure toward an intermediate position on said base plate.

8. A device for checking the alignment of the wheel and axle assembly of the trailer portion of a tractor-trailer which comprises; a portable wheeled support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate for tilting movement thereon about a fore and aft axis, wheel and axle assembly engaging means carried by said structure adjustable into engagement with said assembly to fix said structure in a predetermined spatial position relative to said assembly and with said structure substantially parallel to said axle, and optical means carried by said structure in about the center thereof for establishing optical reference line means extending in the fore and aft direction of the trailer and adapted for registration with the vertical center line of the kingpin at the forward end of the trailer, said wheel and axle assembly engaging means including upstanding upwardly opening V's spaced in the direction of the length of said structure and adapted for engagement with the axle from beneath by vertical movement of said platform to locate the structure angularly of said assembly, and also including means laterally moveable on said structure for engagement with spaced regions of said assembly from the inside, said optical reference line means extending at right angles to the lateral line established by said V's and midway between said spaced regions, said optical means comprising a projector having means to project a beam of light forming said reference line means, and means in the projector defining vertical check line means within said beam.

9. A device according to claim 8, which includes a screen positionable in front of the trailer and means for dropping a line from the kingpin which is near the front of the trailer, said dropped line being on the center line of said kingpin and casting a shadow on said screen.

10. A device for checking the alignment of the wheel and axle assembly of the trailer portion of a tractor-trailer which comprises; a portable wheeled support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate for tilting movement thereon about a fore and aft axis, wheel and axle assembly engaging means carried by said structure adjustable into engagement with said assembly to fix said structure in a predetermined spatial position relative to said assembly and with said structure substantially parallel to said axle, and optical means carried by said structure in about the center thereof for establishing optical reference line means extending in the fore and aft direction of the trailer and adapted for registration with the vertical center line of the kingpin at the forward end of the trailer, said wheel and axle assembly engaging means including upstanding upwardly opening V's spaced in the direction of the length of said structure and adapted for engagement with the axle from beneath by vertical movement of said platform to locate the structure angularly of said assembly, and also including means laterally moveable on said structure for engagement with spaced regions of said assembly from the inside, said optical reference line means extending at right angles to the lateral line established by said V's and midway between said spaced regions, said optical means comprising a projector having means to project a beam of light forming said reference line means, and means in the projector defining vertical check line means within said beam, a projector platform supporting said projector and adjustably connected to said structure, and a frame adjacent said projector platform and fixed to said structure and including means engaging said projector platform and adjustable to adjust the projector platform relative to said structure.

11. A device for checking the alignment of the wheel and axle assembly of the trailer portion of a tractor-trailer which comprises; a portable wheeled support truck having a platform moveable in substantial parallelism with itself in the vertical direction and also rotatable about a vertical axis, and an alignment checking means carried by said platform comprising a base plate fixed to said platform, an elongated structure, means in about the center of said structure connecting the structure to the base plate for tilting movement of the structure about an axis extending at right angles to the length of the structure, said structure including a slide bar slidable on the structure in the direction of the length of the structure, a pair of upstanding upwardly opening V's spaced on said structure in the direction of the length thereof and adapted for engagement with the axle from beneath by vertical movement of said platform to locate the structure in a position parallel to the axis of said assembly, abutment elements carried by said bar and means for moving said abutment elements outwardly on said bar equal amounts in respectively opposite directions to engage spaced regions of the assembly from the inside and locate said bar in the lateral direction of the assembly, and optical means connected to said bar in the center for establishing optical reference line means extending in the fore and aft direction of the trailer and adapted for registration with the vertical center line of the kingpin at the forward end of the trailer.

12. A device according to claim 11, in which said optical means comprises a projector for casting a beam of light having a vertical check line therein, a screen in front of the trailer on which the beam falls and forms an image of said check line, and means connected to the kingpin of the trailer which is near the forward end of the trailer and dropping vertically therefrom on the axis of the kingpin to cast a shadow on the screen.

13. In an alignment checking device for checking the alignment of the wheel and axle assembly of the trailer portion of tractor-trailers; a support truck comprising a wheeled base frame and a platform moveable thereon in a vertical direction and pivotable thereon about a vertical axis, an elongated alignment instrument mounted on the platform and extending upwardly therefrom and including a base plate fixed to the platform, and stop elements on said base frame engageable with said alignment instrument when said platform is in lowered position on said base frame and in a predetermined rotated position thereon to prevent rotation of said instrument and platform about said vertical axis.

14. In an alignment checking device for checking the alignment of the wheel and axle assembly of the trailer portion of tractor-trailers; a support truck comprising a wheeled base frame and a platform moveable thereon in a vertical direction and pivotable thereon about a vertical axis, an alignment elongated instrument mounted on the platform and extending upwardly therefrom and including a base plate fixed to the platform, and stop elements on said base frame engageable with said base plate of said alignment instrument when said platform is in lowered position on said base frame to prevent rotation of said instrument and platform about said vertical axis, said base plate having different dimensions in different directions thereacross, said stop elements being positioned relative to each other and on said base frame so as to engage one edge of the base plate in one rotated position of the instrument when said platform is lowered while in another rotated position of the instrument the base plate is received between said stop elements.

15. In an alignment device; a base plate, a support structure tiltably mounted on said base plate, said support structure comprising side plates in fixed spaced relation, a bar slidably guided between said plates, frame means fixed to the bar, toptical means carried by the frame means, a pair of spaced upstanding upwardly opening V's on the support structure, an abutment member at each end of the structure, a rod connected to each abutment member and extending toward the center of the structure and slidably supported on said structure, a lever pivoted intermediate its ends to said frame, and links connected between the ends of said lever and said rods whereby rotation of said lever will move said abutment members in equal and opposite directions thereby to position said frame means midway between surfaces abutted by said abutment members.

16. In an alignment device; a base plate, a support structure tiltably mounted on said base plate, said support structure comprising side plates in fixed spaced relation, a bar slidably guided between said plates, frame means fixed to the bar, optical means carried by the frame means, a pair of spaced upstanding upwardly opening V's on the support structure, an abutment member at each end of the structure, a rod connected to each abutment member and extending toward the center of the structure and slidably supported on said structure, a lever pivoted intermediate its ends to said frame, and links connected between the ends of said lever and said rods whereby rotation of said lever will move said abutment members in equal and opposite directions thereby to position said frame means midway between surfaces abutted by said abutment members, first spring means urging said structure toward an intermediate position about its pivotal connection with said base plate, and second spring means urging said bar toward a predetermined position in said support structure.

17. In an alignment device; a base plate, a support structure tiltably mounted on said base plate, said support structure comprising side plates in fixed spaced relation, a bar slidably guided between said plates, frame means fixed to the bar, optical means carried by the frame means, a pair of spaced upstanding upwardly opening V's on the support structure, an abutment member at each end of the structure, a rod connected to each abutment member and extending toward the center of the structure and slidably supported on said structure, a lever pivoted intermediate its ends to said frame, and links connected between the ends of said lever and said rods whereby rotation of said lever will move said abutment members in equal and opposite directions thereby to position said frame means midway between surfaces abutted by said abutment members, first spring means urging said structure toward an intermediate position about its pivotal connection with said base plate, and second spring means urging said bar toward a predetermined position in said support structure, said optical means being adjustable relative to said frame means, and at least one of said links being adjustable in effective length.

References Cited

UNITED STATES PATENTS

| 2,000,993 | 5/1935 | Schmidt | 33—203.15 |
| 2,164,853 | 7/1939 | Beckwith | 33—203.15 |
| 2,612,703 | 10/1952 | Castiglia | 33—203.15 |
| 2,845,718 | 8/1958 | Keymer | 33—193 |
| 2,860,852 | 11/1958 | Lewis | 254—10.4 |
| 3,137,076 | 6/1964 | Hurst | 33—203.12 X |
| 3,162,950 | 12/1964 | Hykes | 33—193 X |

FOREIGN PATENTS 468,832  11/1928  Germany.

LEONARD FORMAN, *Primary Examiner.*

W. D. MARTIN, *Assistant Examiner.*